US010787535B2

United States Patent
Nagasawa et al.

(10) Patent No.: US 10,787,535 B2
(45) Date of Patent: Sep. 29, 2020

(54) POLYMERIZABLE COMPOSITION CONTAINING REACTIVE SILSESQUIOXANE COMPOUND CONTAINING PHENANTHRENE RING

(71) Applicant: NISSAN CHEMICAL CORPORATION, Tokyo (JP)

(72) Inventors: Takehiro Nagasawa, Funabashi (JP); Taku Kato, Funabashi (JP); Keisuke Shuto, Funabashi (JP)

(73) Assignee: NISSAN CHEMICAL CORPORATION, Tokyo (JP)

( * ) Notice: Subject to any disclaimer, the term of this patent is extended or adjusted under 35 U.S.C. 154(b) by 142 days.

(21) Appl. No.: 16/093,115

(22) PCT Filed: Mar. 30, 2017

(86) PCT No.: PCT/JP2017/013417
§ 371 (c)(1),
(2) Date: Oct. 11, 2018

(87) PCT Pub. No.: WO2017/179438
PCT Pub. Date: Oct. 19, 2017

(65) Prior Publication Data
US 2019/0169345 A1 Jun. 6, 2019

(30) Foreign Application Priority Data

Apr. 11, 2016 (JP) .................. 2016-078846

(51) Int. Cl.
*C08G 77/04* (2006.01)
*C08F 283/12* (2006.01)
(Continued)

(52) U.S. Cl.
CPC ........ *C08F 283/124* (2013.01); *C08F 230/08* (2013.01); *C08F 290/06* (2013.01);
(Continued)

(58) Field of Classification Search
None
See application file for complete search history.

(56) References Cited

U.S. PATENT DOCUMENTS

2005/0244658 A1* 11/2005 Bae .................. C08G 77/14
428/447
2007/0225466 A1* 9/2007 Matsumoto ............. C08L 83/14
528/25
(Continued)

FOREIGN PATENT DOCUMENTS

JP 2006-312717 A 11/2006
JP 2008-195908 A 8/2008
(Continued)

OTHER PUBLICATIONS

May 30, 2017 Written Opinion of the International Searching Authority issued in International Patent Application No. PCT/JP2017/013417.
(Continued)

*Primary Examiner* — Robert S Loewe
(74) *Attorney, Agent, or Firm* — Oliff PLC

(57) ABSTRACT

A polymerizable composition which can be cured into a cured product exhibiting a low Abbe's number and is suitable for producing a molded article having a further high transparency. A polymerizable composition including 100 parts by mass of a reactive silsesquioxane compound containing a phenanthrene ring (a), and 10 to 500 parts by mass of a polymerizable compound having at least one polymerizable double bond (b), a cured product of the polymerizable composition, and a method for producing a molded article by using of the polymerizable composition.

18 Claims, 1 Drawing Sheet

(51) Int. Cl.
*G02B 1/04* (2006.01)
*C08F 230/08* (2006.01)
*C08F 290/06* (2006.01)
*B29D 11/00* (2006.01)
*B29K 83/00* (2006.01)

(52) U.S. Cl.
CPC ............... *C08G 77/04* (2013.01); *G02B 1/04* (2013.01); *G02B 1/041* (2013.01); *B29D 11/00009* (2013.01); *B29K 2083/00* (2013.01)

(56) References Cited

U.S. PATENT DOCUMENTS

| | | | | |
|---|---|---|---|---|
| 2010/0019399 | A1* | 1/2010 | Kimura | C08F 283/12 257/791 |
| 2010/0123259 | A1* | 5/2010 | Yorisue | C08F 283/12 257/791 |
| 2010/0209669 | A1* | 8/2010 | Aoai | C08F 283/122 428/156 |
| 2011/0230584 | A1* | 9/2011 | Araki | C08F 290/148 522/99 |
| 2018/0079849 | A1* | 3/2018 | Nagasawa | C08F 2/44 |

FOREIGN PATENT DOCUMENTS

| | | |
|---|---|---|
| JP | 2010-97194 A | 4/2010 |
| WO | 2008/065862 A1 | 6/2008 |
| WO | 2015/129818 A1 | 9/2015 |
| WO | 2016/163561 A1 | 10/2016 |
| WO | 2017/030090 A1 | 2/2017 |
| WO | 2017/038943 A1 | 3/2017 |

OTHER PUBLICATIONS

May 30, 2017 International Search Report issued in International Patent Application No. PCT/JP2017/013417.

* cited by examiner

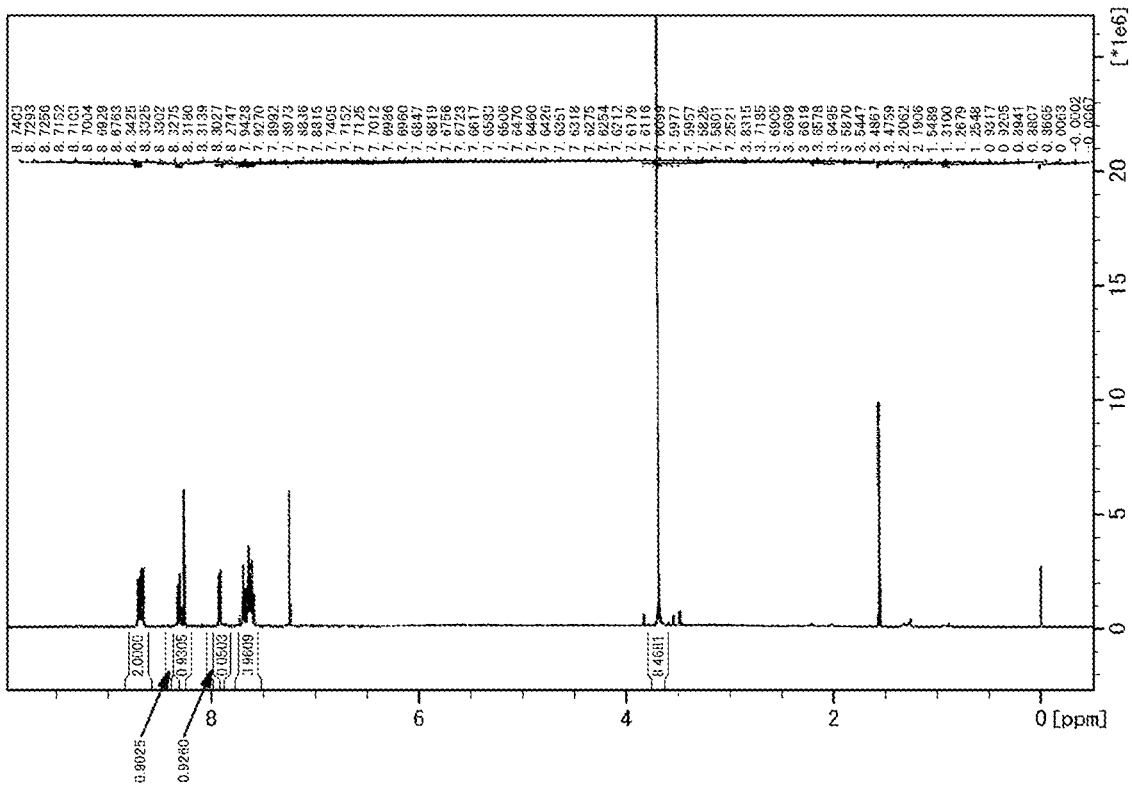

POLYMERIZABLE COMPOSITION CONTAINING REACTIVE SILSESQUIOXANE COMPOUND CONTAINING PHENANTHRENE RING

TECHNICAL FIELD

The present invention relates to a polymerizable composition comprising a reactive silsesquioxane compound containing a phenanthrene ring. Specifically, the present invention relates to a polymerizable composition that can form a cured product having excellent optical characteristics (transparency, low Abbe's number, and high refractive index) and high heat resistance (crack resistance, dimensional stability, and the like).

BACKGROUND ART

Resin lenses are used for electronic devices such as mobile phones, digital cameras, and vehicle-mounted cameras, and are required to have excellent optical characteristics suitable for the purpose of each of the electronic devices. Such resin lenses are also required to have high durability including, for example, heat resistance and weather resistance, and high productivity that enables molding with a good yield, depending on the form of use. As materials for resin lenses that satisfy such requirements, thermoplastic transparent resins such as polycarbonate resins, cycloolefin polymers, and methacrylic resins have been used, for example.

A plurality of lenses is used for a high-resolution camera module. One of the lenses, which serves as a wavelength correction lens, is required to be made of an optical material having a high wavelength dispersion property, that is a low Abbe's number. Additionally, in order to improve the yield or production efficiency for manufacturing resin lenses, and furthermore, to suppress optical axis misalignment in laminating lenses, a shift from injection molding that uses thermoplastic resins to wafer level molding by means of press molding that uses curable resins being liquid at room temperature has been actively contemplated.

As conventional materials that feature a low Abbe's number, a composition including an organic sulfur-containing compound (e.g., see Patent Document 1) and an organic-inorganic composite including titanium oxide are known. However, the former has problems such as an offensive odor from free sulfur and low light transmittance of a cured product (molded article) due to coloring, and the latter has problems such as white turbidity caused by aggregation of inorganic particulates and weakening of the cured product. Thus, it has been difficult for both the materials to be adapted to a practical process.

PRIOR ART DOCUMENT

Patent Document 1: Japanese Patent Application Publication No. 2010-97194 (JP 2010-97194 A)

SUMMARY OF THE INVENTION

Problem to be Solved by the Invention

As described above, there has been yet no curable resin material that has a low Abbe's number (e.g., 24 or less) to be usable as high-resolution camera module lenses as well as satisfies high transparency, and thus development of such a curable resin material has been desired.

The present invention has been made in view of such circumstances, and an object of the present invention is to provide a polymerizable composition of which a cured product exhibits a low Abbe's number and which is suitable for producing a molded article having high transparency.

Means for Solving the Problem

As a result of extensive research to solve the above-described problem, the present inventors have found that a molded article can be obtained by blending a specific reactive silsesquioxane compound containing a phenanthrene ring to a polymerizable composition, and that the cured product (molded article) obtained has high transparency such as a transmittance of 80% or more, additionally exhibits a low Abbe's number and a high refractive index, and is capable of preventing dimensional changes caused by a high-temperature thermal hysteresis, having completed the present invention.

That is, a first aspect of the present invention relates to a polymerizable composition comprising 100 parts by mass of a reactive silsesquioxane compound (a), which is a polycondensate of an alkoxy silicon compound A of formula [1] and an alkoxy silicon compound B of formula [2], and 10 to 500 parts by mass of a polymerizable compound having at least one polymerizable double bond (b):

$$X-Si(OR^1)_3 \quad [1]$$

(wherein X is a phenyl group having at least one substituent having a polymerizable double bond, naphthyl group having at least one substituent having a polymerizable double bond, biphenyl group having at least one substituent having a polymerizable double bond, or a $C_{1-10}$ alkyl group having at least one (meth)acryloyl group, and $R^1$ is a methyl group or ethyl group);

$$Ar^1-Si(OR^2)_3 \quad [2]$$

(wherein $Ar^1$ is a phenanthryl group optionally substituted with a $C_{1-6}$ alkyl group, and $R^2$ is a methyl group or ethyl group).

A second aspect relates to the polymerizable composition according to the first aspect, wherein the polymerizable compound (b) comprises a fluorene compound (b1) of formula [3]:

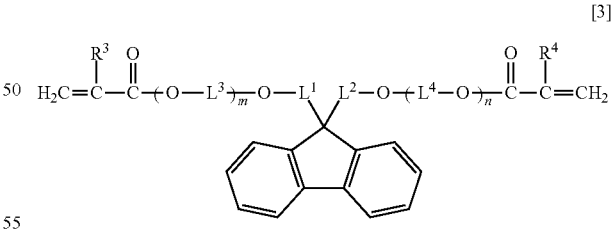

(wherein $R^3$ and $R^4$ are each independently a hydrogen atom or methyl group, $L^1$ and $L^2$ are each independently a phenylene group optionally having a substituent or a naphthalenediyl group optionally having a substituent, $L^3$ and $L^4$ are each independently a $C_{1-6}$ alkylene group, and m and n are each independently zero or a positive integer that satisfies $0 \leq m+n \leq 40$).

A third aspect relates to the polymerizable composition according to the first aspect or the second aspect, wherein the polymerizable compound (b) comprises an aromatic vinyl compound (b2) of formula [4]:

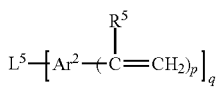
[4]

(wherein $R^5$ is a hydrogen atom or methyl group, $L^5$ is a single bond, hydrogen atom, oxygen atom, a q-valent $C_{1-20}$ aliphatic hydrocarbon residue optionally substituted with phenyl group, or a q-valent $C_{1-20}$ aliphatic hydrocarbon residue optionally comprising an ether bond, $Ar^2$ is a p+1-valent aromatic hydrocarbon residue, p is each independently 1 or 2, and q is an integer of 1 to 3 (provided that q is 1 when $L^5$ is a hydrogen atom and q is 2 when $L^5$ is a single bond or oxygen atom)).

A fourth aspect relates to the polymerizable composition according to any one of the first to third aspects, wherein the alkoxy silicon compound A is a compound of formula [1a]:

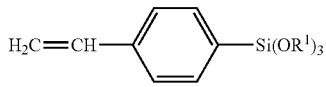
[1a]

(wherein $R^1$ has the same meaning as in formula [1]).

A fifth aspect relates to the polymerizable composition according to any one of the first to fourth aspects, wherein a cured product obtained from the composition has an Abbe's number of 24 or less.

A sixth aspect relates to a cured product of the polymerizable composition according to any one of the first to fifth aspects.

A seventh aspect relates to a high-refractive-index resin lens material comprising the polymerizable composition according to any one of the first to fifth aspects.

An eighth aspect relates to a resin lens produced from the polymerizable composition according to any one of the first to fifth aspect.

A ninth aspect relates to a method for producing a molded article comprising: filling a space between a support and a mold that are in contact with each other or a space inside a dividable mold with the polymerizable composition according to any one of the first to fifth aspects; and photopolymerizing the composition filling the space by exposing the composition to light.

A tenth aspect relates to the production method according to the ninth aspect, further comprising: removing and releasing the resulting photopolymerization product from the space filled with the product; and heating the photopolymerization product before, during, or after the release.

An eleventh aspect relates to the production method according to the ninth or tenth aspect, wherein the molded article is a camera module lens.

A twelfth aspect relates to a reactive silsesquioxane compound obtained by polycondensation of an alkoxy silicon compound A of formula [1] with an alkoxy silicon compound B of formula [2]:

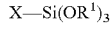
[1]

(wherein X is a phenyl group having at least one substituent having a polymerizable double bond, naphthyl group having at least one substituent having a polymerizable double bond, biphenyl group having at least one substituent having a polymerizable double bond, or a $C_{1-10}$ alkyl group having at least one (meth)acryloyl group, and $R^1$ is a methyl group or ethyl group);

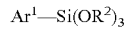
[2]

(wherein $Ar^1$ is a phenanthryl group optionally substituted with a $C_{1-6}$ alkyl group, and $R^2$ is a methyl group or ethyl group).

A thirteenth aspect relates to the reactive silsesquioxane compound according to the twelfth aspect, wherein the alkoxy silicon compound A is a compound of formula [1a]:

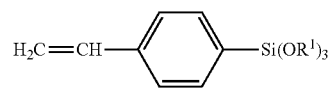
[1a]

(wherein $R^1$ has the same meaning as in formula [1]).

Effects of the Invention

The cured product obtained from the polymerizable composition of the present invention not only has optical characteristics (high transparency, low Abbe's number, and high refractive index) desirable in a lens for an optical device such as a high-resolution camera module, but also has heat resistance (crack resistance, dimensional stability, and the like) to be adaptable to a mounting process for a high-resolution camera module. Particularly, a polymerizable composition comprising the reactive silsesquioxane compound (a), which is a polycondensate of an alkoxy silicon compound A of formula [1a] and an alkoxy silicon compound B of formula [2] and the polymerizable compound (b) comprising at least a fluorene compound (b1) of formula [3] can achieve optical characteristics desirable in a high-resolution camera module lens, including high transparency such as a transmittance of 80% or more, a low Abbe's number of 24 or less, and a high refractive index of 1.62 or more.

Thus, the high-refractive-index resin lens material of the present invention formed of the above-described polymerizable composition can be suitably used as a high-resolution module lens.

Moreover, the production method of the present invention can efficiently produce a molded article, particularly a camera module lens.

Furthermore, the polymerizable composition of the present invention has a viscosity that enables the composition to be sufficiently handled without solvent, and thus can be molded by applying press processing against a mold such as a die (imprint technology). Additionally, the polymerizable composition also has excellent releasability from the mold after molding, and thus a molded article can be suitably produced therefrom.

BRIEF DESCRIPTION OF THE DRAWINGS

FIG. 1 is a $^1$H NMR spectrum of trimethoxy(9-phenanthryl)silane obtained in Production Example 1.

MODES FOR CARRYING OUT THE INVENTION

<<Polymerizable Composition>>
The polymerizable composition of the present invention is a polymerizable composition comprising a specific reactive silsesquioxane compound containing a phenanthrene ring as a component (a) and a polymerizable compound having at least one polymerizable double bond as a component (b). In a preferred aspect, the polymerizable composition comprises, as the polymerizable compound (b), a specific fluorene compound (b1) and additionally a specific aromatic vinyl compound (b2). Each of the components will be hereinafter described in detail.

<(a) Reactive Silsesquioxane Compound>

The reactive silsesquioxane compound (a) used in the present invention is a polycondensate of an alkoxy silicon compound A having a specific structure and an alkoxy silicon compound B having a specific structure described below, specifically a compound containing a phenanthrene ring obtained by polycondensation of the alkoxy silicon compound A with the alkoxy silicon compound B in the presence of an acid or a base.

[Alkoxy Silicon Compound A]

The alkoxy silicon compound A is a compound of formula [1]:

$$X\text{—}Si(OR^1)_3 \qquad [1]$$

wherein X is a phenyl group having at least one substituent having a polymerizable double bond, naphthyl group having at least one substituent having a polymerizable double bond, biphenyl group having at least one substituent having a polymerizable double bond, or a $C_{1\text{-}10}$ alkyl group having at least one (meth)acryloyl group, and $R^1$ is a methyl group or ethyl group.

Examples of the phenyl group having at least one substituent having a polymerizable double bond of X include 2-vinylphenyl group, 3-vinylphenyl group, 4-vinylphenyl group, 4-vinyloxyphenyl group, 4-allylphenyl group, 4-allyloxyphenyl group, and 4-isopropenylphenyl group, Examples of the naphthyl group having at least one substituent having a polymerizable double bond of X include 4-vinylnaphthalen-1-yl group, 5-vinylnaphthalen-1-yl group, 6-vinylnaphthalene-2-yl group, 4-allyloxynaphthalen-1-yl group, 5-allyloxynaphthalen-1-yl group, 8-allyloxynaphthalen-1-yl group, 5-vinyloxynaphthalen-1-yl group, 5-allylnaphthalen-1-yl group, and 5-isopropenylnaphthalen-1-yl group.

Examples of the biphenyl group having at least one substituent having a polymerizable double bond of X include 4'-vinyl-[1,1'-biphenyl]-2-yl group, 4'-vinyl-[1,1'-biphenyl]-3-yl group, 4'-vinyl-[1,1'-biphenyl]-4-yl group, 4'-vinyloxy-[1,1'-biphenyl]-4-yl group, 4'-allyl-[1,1'-biphenyl]-4-yl group, 4'-allyloxy-[1,1'-biphenyl]-4-yl group, and 4'-isopropenyl-[1,1'-biphenyl]-4-yl group.

Examples of the $C_{1\text{-}10}$ alkyl group having at least one (meth)acryloyl group of X include (meth)acryloyloxymethyl group, 2-(meth)acryloyloxyethyl group, 2-(meth)acryloyloxypropyl group, 3-(meth)acryloyloxypropyl group, 4-(meth)acryloyloxybutyl group, and 8-(meth)acryloyloxyoctyl group. The (meth)acryloyl group in the present invention refers to both acryloyl group and methacryloyl group.

Specific examples of the compound of formula [1] include, but are not limited to, trimethoxy(4-vinylphenyl)silane, triethoxy(4-vinylphenyl)silane, (4-isopropenylphenyl)trimethoxysilane, trimethoxy(4-vinyl-1-naphthyl)silane, trimethoxy(4'-vinyl-[1,1'-biphenyl]-4-yl)silane, (3-(meth)acryloyloxypropyl)trimethoxysilane, and (3-(meth)acryloyloxypropyl)triethoxysilane.

[Alkoxy Silicon Compound B]

The alkoxy silicon compound B is a compound of formula [2]:

$$Ar^1\text{—}Si(OR^2)_3 \qquad [2]$$

wherein $Ar^1$ is a phenanthryl group optionally substituted with a $C_{1\text{-}6}$ alkyl group, and $R^2$ is a methyl group or ethyl group.

In the phenanthryl group optionally substituted with a $C_{1\text{-}6}$ alkyl group of $Ar^1$, examples of the $C_{1\text{-}6}$ alkyl group that may be included as the substituent include methyl group, ethyl group, n-propyl group, isopropyl group, n-butyl group, isobutyl group, sec-butyl group, tert-butyl group, n-pentyl group, cyclopentyl group, n-hexyl group, and cyclohexyl group.

Examples of the phenanthryl group optionally substituted with a $C_{1\text{-}6}$ alkyl group of $Ar^1$ include 1-phenanthryl group, 2-phenanthryl group, 3-phenanthryl group, 9-phenanthryl group, 6-methylphenanthren-1-yl group, 7-methylphenanthren-2-yl group, 6-methylphenanthren-3-yl group, 3-ethylphenanthren-9-yl group, and 2-ethylphenanthren-10-yl group. Among them, 9-phenanthryl group is preferred.

Specific examples of the compound of formula [2] include, but are not limited to, trimethoxy(2-phenanthryl)silane, trimethoxy(3-phenanthryl)silane, trimethoxy(9-phenanthryl)silane, and triethoxy(9-phenanthryl)silane.

Among them, the reactive silsesquioxane compound as the component (a) is preferably a reactive silsesquioxane compound obtained by polycondensation of a compound of formula [1a] with a compound of formula [2a] in the presence of an acid or a base:

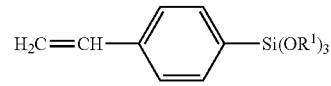

[1a]

wherein $R^1$ has the same meaning as in formula [1];

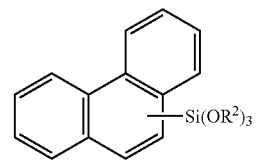

[2a]

wherein $R^2$ has the same meaning as in formula [2].

[Proportions of Alkoxy Silicon Compound A and Alkoxy Silicon Compound B to be Blended]

The molar ratio for the polycondensation reaction of the alkoxy silicon compound A of formula [1] and the alkoxy silicon compound B of formula [2] to be blended, used for the reactive silsesquioxane compound as the component (a) is not particularly limited. Usually, the molar ratio is preferably in the range of the alkoxy silicon compound A:the alkoxy silicon compound B=5:1 to 1:5, in order to stabilize the physical properties of the cured product. More preferably, the molar ratio is in the range between 3:1 to 1:3. When the ratio of the number of moles of the alkoxy silicon compound A to be blended to the number of moles of alkoxy silicon compound B to be blended is set at 5 or less, it is possible to obtain a cured product having a higher refractive index and a lower Abbe's number. When the ratio of the number of moles of alkoxy silicon compound A to be blended to the number of moles of alkoxy silicon compound B to be blended is set at 1/5 or more, a sufficient crosslink density can be achieved, and thus the dimensional stability against heat is further improved.

Appropriate compounds may be selected as required, for use as the alkoxy silicon compound A and the alkoxy silicon compound B, or a plurality of compounds may be used in combination for each of the alkoxy silicon compound A and the alkoxy silicon compound B. Also in this case, the ratio of the total molar amount of the alkoxy silicon compound A to the total molar amount of the alkoxy silicon compound B falls within the range defined above.

[Acid or Basic Catalyst]

The polycondensation reaction between the alkoxy silicon compound A of formula [1] and the alkoxy silicon compound B of formula [2] is suitably performed in the presence of an acid or basic catalyst.

The catalyst used for the polycondensation reaction is not particularly limited in type as long as it is dissolved or homogeneously dispersed in the solvent described below. A suitable catalyst may be selected as required and used.

Examples of the catalysts that can be used include acidic compounds including inorganic acids such as hydrochloric acid, nitric acid, sulfuric acid, and boric acid, organic acids such as acetic acid and oxalic acid; basic compounds such as alkali metal hydroxides, alkaline earth metal hydroxides, ammonium hydroxide, quaternary ammonium salts, and amines; and fluoride salts such as $NH_4F$ and $NR_4F$; wherein R is at least one selected from the group consisting of a hydrogen atom, linear alkyl group having a carbon atom number of 1 to 12, branched alkyl group having a carbon atom number of 3 to 12, and cyclic alkyl group having a carbon atom number of 3 to 12.

One of these catalysts may be used singly or two or more of these may be used in combination.

Examples of the acidic compounds include hydrochloric acid, nitric acid, sulfuric acid, acetic acid, oxalic acid, and boric acid.

Examples of the basic compounds include sodium hydroxide, potassium hydroxide, magnesium hydroxide, calcium hydroxide, strontium hydroxide, barium hydroxide, ammonium hydroxide, tetramethylammonium hydroxide, tetraethylammonium hydroxide, tetrabutylammonium hydroxide, and triethylamine.

Examples of the fluoride salts include ammonium fluoride, tetramethylammonium fluoride, and tetrabutylammonium fluoride.

Among them catalysts, one or more selected from the group consisting of hydrochloric acid, acetic acid, potassium hydroxide, calcium hydroxide, barium hydroxide, and tetraethylammonium hydroxide are preferably used.

The amount of the catalyst used is 0.01 to 10% by mass, preferably 0.1 to 5% by mass, based on the total mass of the alkoxy silicon compound A and the alkoxy silicon compound B. When the amount of the catalyst used is set at 0.01% by mass or more, the reaction proceeds more satisfactorily. In consideration of economy, the catalyst may be used in an amount of 10% by mass or less.

[Polycondensation Reaction]

One feature of the reactive silsesquioxane compound (polycondensate) according to the present invention is the structure of the alkoxy silicon compound A. The reactive group (polymerizable double bond) contained in the alkoxy silicon compound A used in the present invention is readily polymerized by radicals or cations, and exhibits high heat resistance after polymerization (after curing).

The hydrolytic polycondensation reaction between the alkoxy silicon compound A and the alkoxy silicon compound B can be performed without solvent, but a solvent inert to both the alkoxy silicon compounds such as tetrahydrofuran (THF) as described below can be used as a reaction solvent. The use of such a reaction solvent is likely to make the reaction system homogeneous, and thus, has an advantage in that the polycondensation reaction is more stably performed.

Although the synthesis reaction of the reactive silsesquioxane compound may be performed without solvent as described above, a solvent may be used without any problem to make the reaction more homogeneous. The solvent is not particularly limited as long as it does not react with both the alkoxy silicon compounds and dissolves the polycondensate.

Examples of such reaction solvents include ketones such as acetone and methyl ethyl ketone (MEK); aromatic hydrocarbons such as benzene, toluene, and xylene; ethers such as tetrahydrofuran (THF), 1,4-dioxane, diisopropylether, and cyclopentyl methyl ether (CPME); glycols such as ethylene glycol, propylene glycol, and hexylene glycol; glycol ethers such as ethyl cellosolve, butyl cellosolve, ethyl carbitol, butyl carbitol, diethyl cellosolve, and diethyl carbitol; and amides such as N-methyl-2-pyrrolidone (NMP) and N,N-dimethyl formamide (DMF). One of these solvent may be used singly or two or more of these may be used in combination.

The reactive silsesquioxane compound used in the present invention is obtained by hydrolytic polycondensation of the alkoxy silicon compound A of formula [1] with the alkoxy silicon compound B of formula [2], in the presence of an acid or basic catalyst. The reaction temperature used in the hydrolytic polycondensation is 20 to 150° C., more preferably 30 to 120° C.

The reaction time is not particularly limited as long as it is not shorter than a time required to terminate an increase in the molecular weight of the polycondensate and stabilize the molecular weight distribution. The reaction time is from several hours to several days, for example.

After the polycondensation reaction is finished, it is preferred that the reactive silsesquioxane compound obtained be collected using any method such as filtration and distillation-off of the solvent and then be subjected to an appropriate purification treatment, as required.

An example of the method for producing the reactive silsesquioxane compound for use in the present invention is a method including polycondensation of the above alkoxy silicon compound A of formula [1] with the alkoxy silicon compound B of formula [2] in the presence of a base and removing the base using a cation exchange resin.

As the base described above and the amount thereof used, one or more compounds selected from the group consisting of the basic compounds and fluoride salts described above and the amount thereof used may be employed. One or more selected from the group consisting of potassium hydroxide, calcium hydroxide, barium hydroxide, and tetraethylammonium hydroxide are preferably used as the base.

As the reaction conditions and reaction solvent for use in the polycondensation reaction, those described above may be employed.

After the reaction is finished, as the cation exchange resin to be used for removal of the base, an ion exchange resin having sulfo groups as ionic groups is preferably used.

As the cation exchange resin described above, those having a base structure commonly used, such as styrenic (styrene-divinylbenzene copolymer), acrylic cation exchange resins, or the like, may be used. The ion exchange resin may be any of strongly-acidic ion exchange resins having sulfo groups as ionic groups and weakly-acidic cation exchange resins having carboxyl groups as ionic groups. Furthermore, cation exchange resins in various forms such as particles, fibers, or membranes can be used. Commercially available products of these cation exchange resins can be suitably used.

Among them, a strongly-acidic ion exchange resin having sulfo groups as ionic groups is preferably used.

Examples of commercially available strongly-acidic cation exchange resins include Amberlite (registered trademark) 15, 200, 200C, 200CT, 252, 1200 H, IR120B, IR120 H, IR122 Na, IR124, IRC50, IRC86, IRN77, IRP-64, IRP-69, CG-50, and CG-120, Amberjet (registered trademark) 1020, 1024, 1060, 1200, and 1220, Amberlyst (registered trademark) 15, 15DRY, 15JWET, 16, 16WET, 31WET, 35WET, and 36, Dowex (registered trademark) 50Wx2, 50Wx2, 50Wx4, 50Wx8, DR-2030, DR-G8, HCR-W2, 650C UPW, G-26, 88, M-31, and N-406, Dowex (registered trademark) Monosphere (registered trademark) 650C, 88, M-31, 99K/320, 99K/350, and 99Ca/320, and Dowex Marathon (registered trademark) MSC and C [all manufactured by Dow Chemical Company]; Diaion (registered trademark) EXC04, HPK25, PK208, PK212, PK216, PK220, PK228L, RCP160M, SK1B, SK1BS, SK104, SK110, SK112, SK116, UBK510L, and UBK555 [all manufactured by Mitsubishi Chemical Corporation]; and Lewatit (registered trademark) MonoPlusS100 and MonoPlusSP112 [both manufactured by LANXESS Corporation].

Examples of commercially available weakly-acidic cation exchange resins include Amberlite (registered trademark) CG-50, FPC3500, IRC50, IRC76, IRC86, and IRP-64 and Dowex (registered trademark) MAC-3 [all manufactured by Dow Chemical Company]; and Diaion (registered trademark) CWK30/S, WK10, WK11, WK40, WK100, and WT01S [all manufactured by Mitsubishi Chemical Corporation].

The polycondensate obtained by this reaction has a weight average molecular weight Mw of 500 to 100,000, preferably 500 to 30,000, as measured by GPC relative to polystyrene, and has a degree of distribution: Mw (weight average molecular weight)/Mn (number average molecular weight) of 1.0 to 10.

The reactive silsesquioxane compound containing a phenanthrene ring (a) is a compound having a crosslinked structure having at least siloxane units of $[Ar^1SiO_{3/2}]$ and $[Ar^2SiO_{3/2}]$, and the present invention is also directed to the reactive silsesquioxane compound as the component (a) described above.

<(b) Polymerizable Compound Having at Least One Polymerizable Double Bond>

The polymerizable compound (b) for use in the present invention is a compound having at least one polymerizable double bond and preferably contains a fluorene compound (b1) of formula [3] described below. In a more preferred aspect, the polymerizable compound (b) contains an aromatic vinyl compound (b2) of formula [4] described below.

In the present invention, the content of the polymerizable compound (b) [the total content of the fluorene compound (b1), the aromatic vinyl compound (b2), and other polymerizable compounds (b3) described below] may be 10 to 500 parts by mass, preferably 30 to 250 parts by mass, based on 100 parts by mass of the component (a).

<(b1) Fluorene Compound>

The fluorene compound (b1) for use in the present invention is a compound of formula [3]:

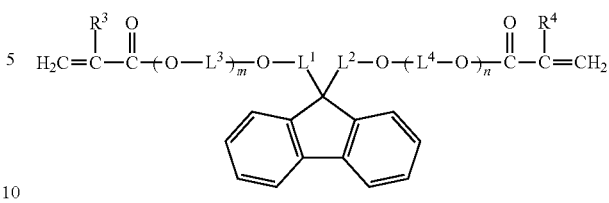

[3]

wherein $R^3$ and $R^4$ are each independently a hydrogen atom or methyl group, $L^1$ and $L^2$ are each independently a phenylene group optionally having a substituent or a naphthalenediyl group optionally having a substituent, $L^3$ and $L^4$ are each independently a $C_{1-6}$ alkylene group, and m and n are each independently zero or a positive integer that satisfies $0 \leq m+n \leq 40$.

Examples of the phenylene group optionally having a substituent of $L^1$ and $L^2$ include o-phenylene group, m-phenylene group, p-phenylene group, 2-methylbenzene-1,4-diyl group, 2-aminobenzene-1,4-diyl group, 2,4-dibromobenzene-1,3-diyl group, and 2,6-dibromobenzene-1,4-diyl group.

Examples of the naphthalenediyl group optionally having a substituent of $L^1$ and $L^2$ include 1,2-naphthalenediyl group, 1,4-naphthalenediyl group, 1,5-naphthalenediyl group, 1,8-naphthalenediyl group, 2,3-naphthalenediyl group, and 2,6-naphthalenediyl group.

Examples of the $C_{1-6}$ alkylene group of $L^3$ and $L^4$ include methylene group, ethylene group, trimethylene group, 1-methylethylene group, tetramethylene group, 1-methyltrimethylene group, 1,1-dimethylethylene group, pentamethylene group, 1-methyltetramethylene group, 2-methyltetramethylene group, 1,1-dimethyltrimethylene group, 1,2-dimethyltrimethylene group, 2,2-dimethyltrimethylene group, 1-ethyltrimethylene group, hexamethylene group, 1-methylpentamethylene group, 2-methylpentamethylene group, 3-methylpentamethylene group, 1,1-dimethyltetramethylene group, 1,2-dimethyltetramethylene group, 2,2-dimethyltetramethylene group, 1-ethyltetramethylene group, 1,1,2-trimethyltrimethylene group, 1,2,2-trimethyltrimethylene group, 1-ethyl-1-methyltrimethylene group, and 1-ethyl-2-methyltrimethylene group.

In the compound of formula [3], m and n are each preferably 0 or a positive integer that satisfies $0 \leq m+n \leq 30$, more preferably a positive integer that satisfies $2 \leq m+n \leq 20$.

Specific examples of the compound of formula [3] include, but are not limited to, 9,9-bis(4-(2-(meth)acryloyloxyethoxy)phenyl)-9H-fluorene, OGSOL (registered trademark) EA-0200, EA-0300, EA-F5003, EA-F5503, EA-F5510, EA-F5710, and GA-5000 [all manufactured by Osaka Gas Chemicals Co., Ltd.], and NK ester A-BPEF [manufactured by Shin-Nakamura Chemical Co., Ltd.].

When the polymerizable composition of the present invention contains the fluorene compound (b1) as the component (b), the content is 10 to 500 parts by mass based on 100 parts by mass of the component (a). Specifically, the content is preferably 30 to 250 parts by mass.

<(b2) Aromatic Vinyl Compound>

The aromatic vinyl compound (b2) for use in the present invention is a compound of formula [4]:

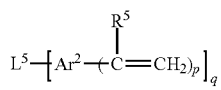
[4]

wherein $R^5$ is a hydrogen atom or methyl group, $L^5$ is a single bond, hydrogen atom, oxygen atom, a q-valent $C_{1-20}$ aliphatic hydrocarbon residue optionally substituted with phenyl group, or a q-valent $C_{1-20}$ aliphatic hydrocarbon residue optionally comprising an ether bond, $Ar^2$ is a p+1-valent aromatic hydrocarbon residue, p is each independently 1 or 2, and q is an integer of 1 to 3 (provided that q is 1 when $L^5$ is a hydrogen atom and q is 2 when $L^5$ is a single bond or oxygen atom).

Examples of the q-valent $C_{1-20}$ aliphatic hydrocarbon in the q-valent $C_{1-20}$ aliphatic hydrocarbon residue optionally substituted with a phenyl group or q-valent $C_{1-20}$ aliphatic hydrocarbon residue optionally comprising an ether bond of $L^5$ include linear alkanes such as methane, ethane, propane, n-butane, n-pentane, n-hexane, n-heptane, n-octane, n-nonane, n-decane, n-undecane, n-dodecane, n-tridecane, n-tetradecane, n-pentadecane, n-hexadecane, n-heptadecane, n-octadecane, n-nonadecane, and n-eicosane; branched alkanes such as 2-methylpropane and 2,2-dimethylpropane; and cyclic alkanes such as cyclopentane and cyclohexane. Examples of the q-valent $C_{1-20}$ aliphatic hydrocarbon residue include alkyl groups, alkanediyl groups, and alkanetriyl groups resulting from removal of one to three hydrogen atoms from the linear alkanes, branched alkanes, and cyclic alkanes described above.

Examples of these residues of $L^5$ include methyl group, ethyl group, n-propyl group, isopropyl group, n-butyl group, n-hexyl group, cyclohexyl group, benzyl group, phenethyl group, methoxymethyl group, ethoxymethyl group, 2-methoxyethyl group, methylene group, ethylene group, trimethylene group, 1-methylethylene group, propane-2,2-diyl group, tetramethylene group, pentamethylene group, 2,2-dimethyltrimethylene group, hexamethylene group, 3-methylpentamethylene group, cyclohexane-1,4-diyl group, diethylene glycol residue (—CH$_2$CH$_2$OCH$_2$CH$_2$—), triethylene glycol residue (—(CH$_2$CH$_2$O)$_2$CH$_2$CH$_2$—), dipropylene glycol residue (—CH(CH$_3$)CH$_2$OCH(CH$_3$) CH$_2$—), oxytetramethyleneoxy group, propane-1,1,1-triyl group, propane-1,1,3-triyl group, butane-1,2,4-triyl group, and cyclohexane-1,3,5-triyl group.

Examples of the p+1-valent aromatic hydrocarbon residue of $Ar^2$ include groups resulting from removal of p+1 hydrogen atoms from an aromatic hydrocarbon ring such as benzene and naphthalene.

Of the compounds of formula [4], a compound in which $L^5$ is a hydrogen atom, q is 1, and p is 2 is preferred.

Specific examples of the compound of formula [4] include styrene, 1-phenethyl-4-vinylbenzene, 1-vinylnaphthalene, 2-vinylnaphthalene, divinylbenzene, diisopropenylbenzene, divinylnaphthalene, 4,4'-divinylbiphenyl, bis(4-vinylphenyl) ether, 1-vinyl-2-(4-vinylphenoxy)benzene, 2,2-bis(4-vinylphenyl)propane, and 1,1,1-tris(4-vinylphenoxy)propane.

Among them, styrene, 1-vinylnaphthalene, divinylbenzene, and 2,2-bis(4-vinylphenyl)propane are preferred, and divinylbenzene is more preferred.

When the polymerizable composition of the present invention contains the aromatic vinyl compound (b2) as the component (b), the content is 1 to 500 parts by mass based on 100 parts by mass of the component (a). Specifically, the content is preferably 3 to 250 parts by mass.

<(b3) Other Polymerizable Compound>

The polymerizable compound (b) for use in the present invention may contain other polymerizable compound other than the fluorene compound (b1) and the aromatic vinyl compound (b2) described above.

As the other polymerizable compound, a vinyl compound or a (meth)acrylate compound other than (b1) and (b2) is preferred. Examples thereof include mono(meth)acrylate compounds having an aromatic group. The (meth)acrylate compound in the present invention refers to both acrylate compounds and methacrylate compounds. For example, (meth)acrylic acid refers to both acrylic acid and methacrylic acid.

Examples of the (meth)acrylate compound include methyl (meth)acrylate, ethyl (meth)acrylate, 2,2,2-trifluoroethyl (meth)acrylate, n-propyl (meth)acrylate, isopropyl (meth)acrylate, n-butyl (meth)acrylate, sec-butyl (meth)acrylate, isobutyl (meth)acrylate, tert-butyl (meth)acrylate, n-hexyl (meth)acrylate, n-octyl (meth)acrylate, isobornyl (meth)acrylate, adamantyl (meth)acrylate, dicyclopentanyl (meth)acrylate, dicyclopentenyl (meth)acrylate, 2-(dicyclopentanyloxy)ethyl (meth)acrylate, 2-(dicyclopentenyloxy)ethyl (meth)acrylate, tetrahydrofurfuryl (meth)acrylate, ethylene glycol di(meth)acrylate, diethylene glycol di(meth)acrylate, polyethylene glycol di(meth)acrylate, propylene glycol di(meth)acrylate, dipropylene glycol di(meth)acrylate, tripropylene glycol di(meth)acrylate, polypropylene glycol di(meth)acrylate, 1,3-butanediol di(meth)acrylate, 1,4-butanediol di(meth)acrylate, neopentyl glycol di(meth)acrylate, propoxylated neopentyl glycol di(meth)acrylate, neopentyl glycol mono(hydroxypivalate) (meth)acrylate, 3-methyl-1,5-pentanediol di(meth)acrylate, 1,6-hexanediol di(meth)acrylate, 2-(3-hydroxy-2-methylpropyl-2-yl)-5-ethyl-5-hydroxymethyl-1,3-dioxane di(meth)acrylate (also called dioxane glycol di(meth)acrylate), tricyclo[5.2.1.0$^{26}$] decane dimethanol di(meth)acrylate, trimethylolethane tri (meth)acrylate, trimethylolpropane tri(meth)acrylate, ethoxylated trimethylolpropane tri(meth)acrylate, propoxylated trimethylolpropane tri(meth)acrylate, pentaerythritol tetra(meth)acrylate, ethoxylated pentaerythritol tetra(meth) acrylate, ditrimethylolpropane tetra(meth)acrylate, and dipentaerythritol hexa(meth)acrylate.

Examples of the mono(meth)acrylate compound having an aromatic group described above include benzyl (meth) acrylate, 2-phenoxyethyl (meth)acrylate, 2-phenoxybenzyl (meth)acrylate, 3-phenoxybenzyl (meth)acrylate, 4-phenoxybenzyl (meth)acrylate, 2-(2-biphenylyloxy)ethyl (meth)acrylate, 2-(3-biphenylyloxy)ethyl (meth)acrylate, 2-(4-biphenylyloxy)ethyl (meth)acrylate, diethylene glycol monophenylether (meth)acrylate, polyethylene glycol monophenylether (meth)acrylate, 2-hydroxy-3-phenoxypropyl(meth)acrylate, neopentyl glycol benzoate (meth)acrylate, and ethoxylated o-phenylphenol (meth)acrylate.

<(c) Polymerization Initiator>

The polymerizable composition of the present invention may contain a polymerization initiator (c) in addition to the component (a) and the component (b). Either of a photopolymerization initiator and a thermal polymerization initiator can be used as the polymerization initiator.

Examples of the photopolymerization initiator include alkylphenones, benzophenones, Michler' ketones, acylphosphine oxides, benzoylbenzoates, oxime esters, tetramethylthiuram monosulfides, and thioxanthones. In particular, a photocleavable photoradical polymerization initiator is preferred.

Examples of commercially available photoradical polymerization initiators include IRGACURE (registered trademark) 184, 369, 651, 500, 819, 907, 784, 2959, CGI1700, CGI1750, CGI1850, CG24-61, and TPO, Darocur (registered trademark) 1116 and 1173 [all manufactured by BASF Japan Ltd.], and ESACURE KIP150, KIP65LT, KIP100F, KT37, KT55, KT046 and KIP75 [all manufactured by Lamberti].

Examples of the thermal polymerization initiator include azos and organic peroxides.

Examples of commercially available azo-based thermal polymerization initiators include V-30, V-40, V-59, V-60, V-65, and V-70 [all manufactured by Wako Pure Chemical Industries, Ltd.].

Examples of commercially available organic peroxide-based thermal polymerization initiators include, but are not limited to, Perkadox (registered trademark) CH, BC-FF, 14, and 16, Trigonox (registered trademark) 22, 23, and 121, Kayaester (registered trademark) P and O, and Kayabutyl (registered trademark) B [all manufactured by Kayaku Akzo Corporation], and PERHEXA (registered trademark) HC, PERCUMYL (registered trademark) H, PEROCTA (registered trademark) O, PERHEXYL (registered trademark) O and Z, and PERBUTYL (registered trademark) O and Z (all manufactured by NOF Corporation).

When a polymerization initiator is added, one polymerization initiator may be used singly or two or more polymerization initiators may be mixed and used. The amount of the polymerization initiator to be added is 0.1 to 20 parts by mass, preferably 0.3 to 10 parts by mass, based on 100 parts by mass in total of the polymerizable components, that is, the component (a) and the component (b).

Furthermore, from the viewpoint of providing the cured product obtained from the polymerizable composition with a high refractive index, a preferred aspect of the present invention is a polymerizable composition from which a cured product to be obtained has an Abbe's number of 26 or less, preferably 24 or less.

<Other Additives>

The polymerizable composition of the present invention may also contain, as required, a chain transfer agent, an antioxidant, an ultraviolet absorber, a photostabilizer, a leveling agent, a rheology-controlling agent, an adhesion adjuvant such as a silane coupling agent, a pigment, a dye, a defoaming agent, and the like, as long as they do not impair the effects of the present invention.

Examples of the chain transfer agent include: thiol compounds including mercaptocarboxylic acid esters such as methyl mercaptoacetate, methyl 3-mercaptopropionate, 2-ethylhexyl 3-mercaptopropionate, 3-methoxybutyl 3-mercaptopropionate, n-octyl 3-mercaptopropionate, stearyl 3-mercaptopropionate, 1,4-bis(3-mercaptopropionyloxy)butane, 1,4-bis(3-mercaptobutyryloxy)butane, trimethylolethane tris(3-mercaptopropionate), trimethylolethane tris(3-mercaptobutyrate), trimethylolpropane tris(3-mercaptopropionate), trimethylolpropane tris(3-mercaptobutyrate), pentaerythritol tetrakis(3-mercaptopropionate), pentaerythritol tetrakis(3-mercaptobutyrate), dipentaerythritol hexakis(3-mercaptopropionate), dipentaerythritol hexakis(3-mercaptobutyrate), tris[2-(3-mercaptopropionyloxy)ethyl] isocyanurate, and tris[2-(3-mercaptobutyryloxy)ethyl] isocyanurate; alkylthiols such as ethanethiol, 2-methylpropane-2-thiol, n-dodecanethiol, 2,3,3,4,4,5-hexamethylhexane-2-thiol (tert-dodecanethiol), ethane-1,2-dithiol, propane-1,3-dithiol, and benzylthiol; aromatic thiols such as benzenethiol, 3-methylbenzenethiol, 4-methylbenzenethiol, naphthalene-2-thiol, pyridine-2-thiol, benzimidazole-2-thiol, and benzothiazole-2-thiol; mercaptoalcohols such as 2-mercaptoethanol and 4-mercapto-1-butanol; and silane-containing thiols such as 3-(trimethoxysilyl)propane-1-thiol and 3-(triethoxysilyl)propane-1-thiol;

disulfide compounds including alkyl disulfides such as diethyl disulfide, dipropyl disulfide, diisopropyl disulfide, dibutyl disulfide, di-tert-butyl disulfide, dipentyl disulfide, diisopentyl disulfide, dihexyl disulfide, dicyclohexyl disulfide, didecyl disulfide, bis(2,3,3,4,4,5-hexamethylhexan-2-yl) disulfide (di-tert-dodecyl disulfide), bis(2,2-diethoxyethyl) disulfide, bis(2-hydroxyethyl) disulfide, and dibenzyl disulfide; aromatic disulfides such as diphenyl disulfide, di-p-tolyl disulfide, di(pyridin-2-yl)pyridyl disulfide, di(benzimidazol-2-yl) disulfide, and di(benzothiazol-2-yl) disulfide; and thiuram disulfides such as tetramethylthiuram disulfide, tetraethylthiuram disulfide, tetrabutylthiuram disulfide, and bis(pentamethylene)thiuram disulfide; and α-methylstyrene dimers.

When a chain transfer agent is added, one chain transfer agent may be used singly or two or more chain transfer agents may be mixed and used. The amount thereof added is 0.01 to 20 parts by mass, preferably 0.1 to 10 parts by mass, based on 100 parts by mass in total of the polymerizable components, that is, the component (a) and the component (b).

Examples of the antioxidant include phenolic antioxidants, phosphoric acid-based antioxidants, and sulfide-based antioxidants. Among them, phenolic antioxidants are preferred.

Examples of phenolic antioxidants include IRGANOX (registered trademark) 245, 1010, 1035, 1076, and 1135 [all manufactured by BASF Japan Ltd.], SUMILIZER (registered trademark) GA-80, GP, MDP-S, BBM-S, and WX-R [all manufactured by Sumitomo Chemical Co., Ltd.], and ADK STAB (registered trademark) AO-20, AO-30, AO-40, AO-50, AO-60, AO-80, and AO-330 [all manufactured by ADEKA Corporation].

When an antioxidant is added, one antioxidant may be used singly or two or more antioxidants may be mixed and used. The amount thereof added is 0.01 to 20 parts by mass, preferably 0.1 to 10 parts by mass, based on 100 parts by mass in total of the polymerizable components, that is, the component (a) and the component (b).

<Method for Preparing Polymerizable Composition>

The method for preparing the polymerizable composition of an embodiment of the present invention is not particularly limited. Examples of the preparation method include a method in which the component (a), the component (b), and, as required, the component (c) are mixed in predetermined proportions, and other additives are further added, as desired, and mixed to form a homogeneous solution; a method in which at least a portion of the component (a) and the component (b), for example, are mixed to form a homogeneous solution, after which other components are added, and other additives are further added, as desired, and mixed to form a homogeneous solution; or a method in which a conventional solvent is used in addition to these components.

When a solvent is used, the proportion of the solid content in the polymerizable composition of the present invention is not particularly limited as long as the components are homogeneously dissolved in the solvent, but is 1 to 50% by mass, 1 to 30% by mass, or 1 to 25% by mass, for example. The solid content as used herein refers to all the components of the polymerizable composition excluding the solvent component.

The solution of the polymerizable composition is preferably used after being filtered through a filter with a pore size of 0.1 to 5 μm or the like.

<<Cured Product>>

A cured product can be obtained by exposing the polymerizable composition to light (photocuring) or heating the polymerizable composition (thermal curing). The present invention is also directed to the cured products of the polymerizable compound.

Examples of exposure light beams include ultraviolet light, electron beams, and X-rays. Examples of light sources that can be used for UV irradiation include sunlight, a chemical lamp, a low-pressure mercury lamp, a high-pressure mercury lamp, a metal halide lamp, a xenon lamp, and UV-LED. After the exposure, post-exposure bake may be applied to stabilize the physical properties of the cured product. The method of post-exposure bake is not particularly limited; typically, post-exposure bake is performed with, for example, a hot plate or an oven in the range of 50 to 260° C. and 1 to 120 minutes.

The heating conditions for thermal curing are typically selected, as appropriate, from the range of 50 to 300° C. and 1 to 120 minutes, although not particularly limited thereto. Examples of heating means include, although not particularly limited to, a hot plate and an oven.

The cured product that is obtained by curing the polymerizable composition of the present invention, has an Abbe's number as low as 24 or less and has a refractive index at a wavelength of 588 nm (d ray) as high as 1.620 or more. Additionally, the cured product, in which occurrence of cracking or release from a support due to heating is suppressed, has dimensional stability. Thus, it is possible to suitably use the cured product as a high-refractive-index resin lens material.

<<Molded Article>>

Various molded articles can be readily produced in parallel with the formation of the cured product, by applying conventional molding processes such as compression molding (imprinting or the like), casting, injection molding, and blow molding to the polymerizable composition of the present invention. Molded articles thus obtained are also subjects of the present invention.

An example of a method for producing a molded article includes a method comprising: filling a space between a support and a mold that are in contact with each other or a space inside a dividable mold with the polymerizable composition of the present invention, photopolymerizing the composition filling the space by exposing the composition to light, removing and releasing the resulting photopolymerization product from the space filled with the product, and heating the photopolymerization product before, during, or after the release.

The step of photopolymerization by exposure to light can be performed by applying the conditions described in <<Cured Product>> above.

The conditions for the heating step are typically selected, as appropriate, from the range of 50 to 260° C. and 1 to 120 minutes, although not particularly limited thereto.

Examples of heating means include, although not particularly limited thereto, a hot plate and an oven.

The molded article produced by such a method can be suitably used as a camera module lens.

EXAMPLES

The present invention will be hereinafter described in more detail with reference to examples; however, the present invention is not limited to the following examples.

In the Examples, the apparatuses and conditions used for the preparation of samples and analysis of physical properties are as follows.

(1) $^1$H NMR Spectrum
  Apparatus: AVANCE III HD manufactured by Bruker Corporation
  Measurement frequency: 500 MHz
  Solvent: $CDCl_3$
  Internal reference: tetramethylsilane (60.00 ppm)

(2) Gel Permeation Chromatography (GPC)
  Apparatus: Prominence (registered trademark) GPC system manufactured by Shimadzu Corporation
  Column: Shodex (registered trademark) GPC KF-804L and GPC KF-803L manufactured by Showa Denko K.K.
  Column temperature: 40° C.
  Solvent: tetrahydrofuran
  Detector: RI
  Calibration curve: standard polystyrene (3) Refractive Index $n_d$, Abbe's Number $v_d$
  Apparatus: Prism Coupler Model 2010/M manufactured by Metricon Corporation
  Measurement temperature: room temperature (about 23° C.)

(4) Stirring and Defoaming Machine
  Apparatus: planetary centrifugal mixer, AWATORI RENTARO (registered trademark) ARE-310 manufactured by THINKY CORPORATION (5) UV Exposure
  Apparatus: batch-type UV irradiator (high-pressure mercury lamp, 2 kW×one lamp) manufactured by EYE GRAPHICS CO., LTD.

(6) Nanoimprinter
  Apparatus: NM-0801HB manufactured by Meisyo Kiko Co., Ltd.
  Pressing pressure: 150 N
  UV exposure dose: 20 mW/cm$^2$, 150 seconds (7) Reflow Oven
  Apparatus: table-top reflow oven STR-3100 manufactured by SHINAPEX CO., LTD.

(8) Lens Height
  Apparatus: contactless surface texture-measuring apparatus PF-60 manufactured by Mitaka Kohki Co., Ltd.

The abbreviations represent the following meanings:
PheTMS: trimethoxy(9-phenanthryl)silane
STMS: trimethoxy(4-vinylphenyl)silane [manufactured by Shin-Etsu Chemical Co., Ltd.]
TEAH: 35% by mass tetraethylammonium hydroxide aqueous solution [manufactured by Aldrich]
TMOS: tetramethoxysilane [manufactured by Tokyo Chemical Industry Co., Ltd.]
BnA: benzyl acrylate [Viscoat #160 manufactured by Osaka Organic Chemical Industry Ltd.]
DVB: divinylbenzene [DVB-810 manufactured by Nippon Steel & Sumikin Chemical Co., Ltd.]
FDA: bisarylfluorene diacrylate [OGSOL (registered trademark) EA-F5503 manufactured by Osaka Gas Chemicals Co., Ltd.]
DDT: n-dodecanethiol [THIOKALCOL 20 manufactured by Kao Corporation]
I184: 1-hydroxycyclohexyl phenyl ketone [IRGACURE (registered trademark) 184 manufactured by BASF Japan Ltd.]
TPO: diphenyl(2,4,6-trimethylbenzoyl)phosphine oxide [IRGACURE (registered trademark) TPO manufactured by BASF Japan Ltd.]
THF: tetrahydrofuran

[Production Example 1] Production of Trimethoxy(9-phenanthryl)silane (PheTMS)

To a 500-mL reaction flask equipped with a condenser, 10.4 g (0.43 mol) of magnesium shavings [manufactured by KANTO CHEMICAL CO., INC.] was charged, and the air in the flask was purged with nitrogen using a nitrogen balloon. To the flask, a mixture of 100.3 g (0.39 mol) of 9-bromophenanthrene [manufactured by Tokyo Chemical Industry Co., Ltd.] and 346 g of THF was added dropwise at room temperature (about 23° C.) over one hour, and the solution was stirred for further 30 minutes to prepare a Grignard reagent.

To a 1-L reaction flask, 178.0 g (1.17 mol) of TMOS and 346 g of THF were charged, and the air in the flask was purged with nitrogen using a nitrogen balloon. To the flask, the above Grignard reagent was added dropwise at room temperature (about 23° C.) over 30 minutes, and the solution was stirred for further two hours. THF was distilled off from this reaction mixture under reduced pressure using an evaporator. To the residue obtained, 1,000 g of hexane was added to dissolve the soluble matter, and then the insoluble matter was filtered off. To the insoluble matter, 500 g of hexane was added again, and the insoluble matter was filtered off in the same manner. The filtrates were mixed, and the hexane was distilled off under reduced pressure using an evaporator to obtain a crude product. The crude product was distilled under reduced pressure (1 mmHg, 120 to 150° C.), and then recrystallized using 389 g of methanol to obtain 74.6 g of the target PheTMS (yield: 64%).

The $^1$H NMR spectrum of the compound obtained is shown in FIG. 1.

[Example 1] Production of Reactive Silsesquioxane Compound 1 (SPe64)

To a 200-mL reaction flask equipped with a condenser, 0.356 g (0.84 mmol) of TEAH, 1.21 g (66.9 mmol) of ion exchange water, and 9 g of THF were charged, and the air in the flask was purged with nitrogen using a nitrogen balloon. To the flask, a mixture of 5.64 g (25.1 mmol) of STMS and 5.00 g (16.8 mmol) of PheTMS produced in accordance with Production Example 1 were added dropwise at room temperature (about 23° C.) over 10 minutes, and the mixture was stirred at 40° C. for four hours. The mixture obtained was cooled to room temperature (about 23° C.). Then, to this reaction mixture, 1.1 g of a cation exchange resin [Amberlyst (registered trademark) 15JWET manufactured by Dow Chemical Company] washed with THF in advance and 0.21 g of a filter aid [KC FLOCK W-100GK manufactured by Nippon Paper Industries Co., Ltd.] were added. The mixture was stirred for one hour, and then the reaction was stopped. Thereafter, the cation exchange resin and the filter aid were filtered through a membrane filter having a pore size of 0.5 µm, and washed off with 11 g of ethyl acetate. The filtrate and washing liquid were combined and added to 225 g of methanol to precipitate the polymer. This precipitate was filtered and dried to obtain 6.79 g of the target reactive silsesquioxane compound 1 (hereinafter abbreviated as SPe64 in some cases).

The compound obtained had a weight average molecular weight Mw of 2,300 as measured by GPC relative to polystyrene, and had a degree of distribution: Mw (weight average molecular weight)/Mn (number average molecular weight) of 1.3.

[Example 2] Production of Reactive Silsesquioxane Compound 2 (SPe55)

To a 200-mL reaction flask equipped with a condenser, 2.40 g (5.7 mmol) of TEAH, 7.69 g (426 mmol) of ion exchange water, and 60 g of THF were charged, and the air in the flask was purged with nitrogen using a nitrogen balloon. To the flask, a mixture of 31.9 g (142 mmol) of STMS and 42.5 g (142 mmol) of PheTMS produced in accordance with Production Example 1 were added dropwise at room temperature (about 23° C.) over 10 minutes, and the mixture was stirred at 40° C. for four hours. The mixture obtained was cooled to room temperature (about 23° C.). Then, to this reaction mixture, 7.4 g of a cation exchange resin [Amberlyst (registered trademark) 15JWET manufactured by Dow Chemical Company] washed with THF in advance and 1.5 g of a filter aid [KC FLOCK W-100GK manufactured by Nippon Paper Industries Co., Ltd.] were added. The mixture was stirred for one hour, and then the reaction was stopped. Thereafter, the cation exchange resin and the filter aid were filtered through a membrane filter having a pore size of 0.5 µm, and further washed off with 75 g of ethyl acetate. The filtrate and washing liquid were combined and added to 2,300 g of methanol to precipitate the polymer. This precipitate was filtered and dried to obtain 50.2 g of the target reactive silsesquioxane compound 2 (hereinafter abbreviated as SPe55 in some cases).

The compound obtained had a weight average molecular weight Mw of 1,800 as measured by GPC relative to polystyrene, and had a degree of distribution: Mw/Mn of 1.2.

[Example 3] Production of Reactive Silsesquioxane Compound 3 (SPe46)

To a 200-mL reaction flask equipped with a condenser, 0.235 g (0.56 mmol) of TEAH, 0.803 g (44.6 mmol) of ion exchange water, and 6 g of THF were charged, and the air in the flask was purged with nitrogen using a nitrogen balloon. To the flask, a mixture of 2.51 g (11.2 mmol) of STMS and 5.00 g (16.8 mmol) of PheTMS produced in accordance with Production Example 1 were added dropwise at room temperature (about 23° C.) over 10 minutes, and the mixture was stirred at 40° C. for four hours. The mixture obtained was cooled to room temperature (about 23° C.). Then, to this reaction mixture, 0.75 g of a cation exchange resin [Amberlyst (registered trademark) 15JWET manufactured by Dow Chemical Company] washed with THF in advance and 0.15 g of a filter aid [KC FLOCK W-100GK manufactured by Nippon Paper Industries Co., Ltd.] were added. The mixture was stirred for one hour, and then the reaction was stopped. Thereafter, the cation exchange resin and the filter aid were filtered through a membrane filter having a pore size of 0.5 µm, and washed off with 7.5 g of ethyl acetate. The filtrate and washing liquid were combined and added to 225 g of methanol to precipitate the polymer. This precipitate was filtered and dried to obtain 4.64 g of the target reactive silsesquioxane compound 3 (hereinafter abbreviated as SPe46 in some cases).

The compound obtained had a weight average molecular weight Mw of 1,570 as measured by GPC relative to polystyrene, and had a degree of distribution: Mw/Mn of 1.1.

[Example 4] Preparation of Polymerizable Composition 1

Mixed with stirring were 53 parts by mass of SPe64 produced in Example 1 as the reactive silsesquioxane compound (a), 20 parts by mass of FDA as the fluorene compound (b1), 12 parts by mass of DVB as the aromatic vinyl compound (b2), 15 parts by mass of BnA as the other polymerizable compound (b3), 2 parts by mass of DDT as a chain transfer agent (reaction accelerator), and 4 parts by mass of 1184 and 0.2 parts by mass of TPO as polymerization initiators, at 50° C. for three hours. The mixture was defoamed with stirring for further 10 minutes to prepare a polymerizable composition 1.

[Examples 5 to 11 and Comparative Example 1] Preparation of polymerizable compositions 2 to 9

Polymerizable compositions 2 to 9 were prepared as in Example 4 except that each of the compositions was changed as shown in Table 1. In Table 1, "part(s)" denotes "part(s) by mass".

TABLE 1

| Example | Polymerizable composition | (a) Silsesquioxane | [Parts] | (b1)FDA [Parts] | (b2)DVB [Parts] | (b3)BnA [Parts] | DDT [Parts] | I184 [Parts] | TPO [Parts] |
|---|---|---|---|---|---|---|---|---|---|
| Example 4 | Polymerizable composition 1 | SPe64 | 53 | 20 | 12 | 15 | 2 | 4 | 0.2 |
| Example 5 | Polymerizable composition 2 | SPe55 | 40 | 33 | 12 | 15 | 2 | 4 | 0.2 |
| Example 6 | Polymerizable composition 3 | SPe55 | 45 | 35 | 20 | — | 2 | 4 | 0.2 |
| Example 7 | Polymerizable composition 4 | SPe55 | 53 | 20 | 12 | 15 | 2 | 4 | 0.2 |
| Example 8 | Polymerizable composition 5 | SPe46 | 40 | 33 | 12 | 15 | 2 | 4 | 0.2 |
| Example 9 | Polymerizable composition 6 | SPe46 | 45 | 28 | 12 | 15 | 2 | 4 | 0.2 |
| Example 10 | Polymerizable composition 7 | SPe46 | 53 | 20 | 12 | 15 | 2 | 4 | 0.2 |
| Example 11 | Polymerizable composition 8 | SPe46 | 53 | 20 | — | 27 | 2 | 4 | 0.2 |
| Comparative Example 1 | Polymerizable composition 9 | none | — | 73 | 12 | 15 | 2 | 4 | 0.2 |

[Production of Cured Product and Evaluation of Optical Characteristics]

Each polymerizable composition, together with a 1 mm-thick silicone rubber spacer, was sandwiched between two glass substrates that had been subjected to a release treatment. The sandwiched polymerizable composition was exposed to UV light at 20 mW/cm$^2$ for 150 seconds. The cured product was released from the glass substrates and then heated on a hot plate at 150° C. for 20 minutes to produce a specimen having a diameter of 30 mm and a thickness of 1 mm.

The resulting specimen was measured for transmittance at a wavelength of 410 nm, refractive index $n_d$ at a wavelength of 588 nm (D ray), and Abbe's number $v_d$. The results are shown in Table 2.

TABLE 2

| Example/ Comparative Example | Polymerizable composition | Transmittance (410 nm) | Refractive index $n_d$ | Abbe's number $v_d$ |
|---|---|---|---|---|
| Example 4 | Polymerizable composition 1 | 84.2 | 1.627 | 23.5 |
| Example 5 | Polymerizable composition 2 | 85.7 | 1.625 | 23.3 |
| Example 6 | Polymerizable composition 3 | 85.0 | 1.633 | 22.8 |
| Example 7 | Polymerizable composition 4 | 84.9 | 1.633 | 22.9 |
| Example 8 | Polymerizable composition 5 | 86.9 | 1.630 | 23.8 |
| Example 9 | Polymerizable composition 6 | 86.0 | 1.631 | 23.3 |
| Example 10 | Polymerizable composition 7 | 85.7 | 1.636 | 23.0 |
| Example 11 | Polymerizable composition 8 | 82.3 | 1.627 | 23.3 |
| Comparative Example 1 | Polymerizable composition 9 | 87.2 | 1.606 | 29.4 |

As shown in Table 2, the cured products obtained from the polymerizable compositions of the present invention shown in Examples 4 to 11 were confirmed to have high transparency such as a transmittance of 80% or more and exhibit a high refractive index of 1.62 or more and a low Abbe's number of 24 or less.

Meanwhile, the cured product obtained from the polymerizable composition not containing reactive silsesquioxane (Comparative Example 1) has a high Abbe's number of 29.4. It was confirmed that the cured product did not achieve the performance desired for a lens having a low Abbe's number in a high-resolution camera module lens (Abbe's number: 24 or less) and cannot be said to be suitable for use in the lens, and thus the superiority of the present invention was exhibited.

[Example 12]

The polymerizable composition 4 of Example 7 was molded into a lens shape on a glass substrate serving as a support, using a nickel mold (25 2-mm-diameter lens-shaped molds arranged in five rows and five columns) and a nanoimprinter, in accordance with the method for producing a molded article described above. The mold used had been subjected to a release treatment in advance with Novec (registered trademark) 1720 [manufactured by 3M Company]. The glass substrate used had been subjected to an adhesion treatment in advance with Shinetsu Silicone (R) KBM-503 [manufactured by Shin-Etsu Chemical Co., Ltd.]. After the cured product was removed from the mold, the cured product was heated in an oven at 150° C. for 20 minutes to produce convex lenses on the glass substrate.

For any three convex lenses obtained on the glass substrate, the lens height (thickness) before and after a heating test using a reflow oven was measured using the contactless surface texture-measuring apparatus, and the dimensional stability for heating was evaluated by calculating the change ratio by the following expression: [(lens height before heating−lens height after heating)/lens height before heating×100]. Furthermore, the convex lenses after the heating test were inspected for occurrence of cracks using a microscope supplied with the contactless surface texture-measuring apparatus. In the heating test, the resulting convex lenses obtained on the glass substrate were placed in a reflow oven, and the following three steps: 1) raising the temperature to 260° C. over 3 minutes; 2) maintaining at 260° C. for 20 seconds; and 3) allowing to cool to 50° C.; were repeated three times. The results are shown in Table 3.

TABLE 3

| Example/ Comparative Example | Polymerizable composition | Cracking after heating | Lens height [μm] Before heating | Lens height [μm] After heating | Change ratio [%] |
|---|---|---|---|---|---|
| Example 12 | Polymerizable composition 4 | None | 474.0 | 471.6 | 0.49 |

On consideration of a high-resolution camera module lens, it is desired that the change ratio of the lens height after the reflow process be less than ±1.0%, particularly less than ±0.5%. As shown in Table 3, a result was obtained that the convex lenses obtained from the polymerizable composition of the present invention (Example 12) had a small change in the lens height even after being subjected to the reflow step at 260° C. three times and thus had high dimensional stability.

The invention claimed is:

1. A polymerizable composition comprising: 100 parts by mass of a reactive silsesquioxane compound (a), which is a polycondensate of an alkoxy silicon compound A of formula [1] and an alkoxy silicon compound B of formula [2], and 10 to 500 parts by mass of a polymerizable compound having at least one polymerizable double bond (b):

X—Si(OR$^1$)$_3$     [1]

where X is a phenyl group having at least one substituent having a polymerizable double bond, naphthyl group having at least one substituent having a polymerizable double bond, biphenyl group having at least one substituent having a polymerizable double bond, or a C$_{1-10}$ alkyl group having at least one (meth)acryloyl group, and R$^1$ is a methyl group or ethyl group;

Ar$^1$—Si(OR$^2$)$_3$     [2]

where Ar$^1$ is a phenanthryl group optionally substituted with a C$_{1-6}$ alkyl group, and R$^2$ is a methyl group or ethyl group, wherein the polymerizable compound (b) comprises a fluorene compound (b1) of formula [3]:

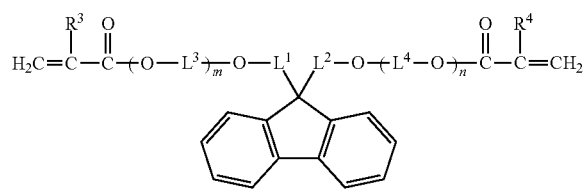

[3]

where R$^3$ and R$^4$ are each independently a hydrogen atom or methyl group, L$^1$ and L$^2$ are each independently a naphthalenediyl group optionally having a substituent, L$^3$ and L$^4$ are each independently a C$_{1-6}$ alkylene group, and m and n are each independently zero or a positive integer that satisfies 0≤m+n≤40.

2. The polymerizable composition according to claim 1, wherein the alkoxy silicon compound A is a compound of formula [1a]:

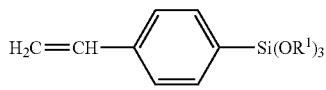

[1a]

where R$^1$ has the same meaning as in formula [1].

3. The polymerizable composition according to claim 1, wherein a cured product obtained from the composition has an Abbe's number of 24 or less.

4. A cured product of the polymerizable composition according to claim 1.

5. A high-refractive-index resin lens material comprising the polymerizable composition according to claim 1.

6. A resin lens produced from the polymerizable composition according to claim 1.

7. A method for producing a molded article comprising: filling a space between a support and a mold that are in contact with each other or a space inside a dividable mold with the polymerizable composition according to claim 1; and photopolymerizing the composition filling the space by exposing the composition to light.

8. The production method according to claim 7, further comprising: removing and releasing the resulting photopolymerization product from the space filled with the product; and heating the photopolymerization product before, during, or after the release.

9. The production method according to claim 7, wherein the molded article is a camera module lens.

10. A polymerizable composition comprising: 100 parts by mass of a reactive silsesquioxane compound (a), which is a polycondensate of an alkoxy silicon compound A of formula [1] and an alkoxy silicon compound B of formula [2], and 10 to 500 parts by mass of a polymerizable compound having at least one polymerizable double bond (b):

X—Si(OR$^1$)$_3$     [1]

where X is a phenyl group having at least one substituent having a polymerizable double bond, naphthyl group having at least one substituent having a polymerizable double bond, biphenyl group having at least one substituent having a polymerizable double bond, or a C$_{1-10}$ alkyl group having at least one (meth)acryloyl group, and R$^1$ is a methyl group or ethyl group;

Ar$^1$—Si(OR$^2$)$_3$     [2]

where Ar$^1$ is a phenanthryl group optionally substituted with a C$_{1-6}$ alkyl group, and R$^2$ is a methyl group or ethyl group, wherein the polymerizable compound (b) comprises a aromatic vinyl compound (b2) of formula [4]:

[4]

where R$^5$ is a hydrogen atom or methyl group, L$^5$ is a single bond, hydrogen atom, oxygen atom, a q-valent C$_{1-20}$ aliphatic hydrocarbon residue optionally substituted with phenyl group, or a q-valent C$_{1-20}$ aliphatic hydrocarbon residue optionally comprising an ether bond, Ar$^2$ is a p+1-valent aromatic hydrocarbon residue, p is each independently 1 or 2, and q is an integer of 1 to 3 with the proviso that q is 1 when $L^5$ is a hydrogen atom and q is 2 when $L^5$ is a single bond or oxygen atom.

11. The polymerizable composition according to claim 10, wherein the alkoxy silicon compound A is a compound of formula [1a]:

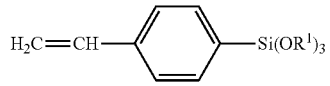

[1a]

wherein $R^1$ has the same meaning as in formula [1].

12. The polymerizable composition according to claim 10, wherein a cured product obtained from the composition has an Abbe's number of 24 or less.

13. A cured product of the polymerizable composition according to claim 10.

14. A high-refractive-index resin lens material comprising the polymerizable composition according to claim 10.

15. A resin lens produced from the polymerizable composition according to claim 10.

16. A method for producing a molded article comprising: filling a space between a support and a mold that are in contact with each other or a space inside a dividable mold with the polymerizable composition according to claim 10; and photopolymerizing the composition filling the space by exposing the composition to light.

17. The production method according to claim 16, further comprising: removing and releasing the resulting photopolymerization product from the space filled with the product; and heating the photopolymerization product before, during, or after the release.

18. The production method according to claim 16, wherein the molded article is a camera module lens.

* * * * *